United States Patent
Wendel

(10) Patent No.: US 9,000,975 B2
(45) Date of Patent: Apr. 7, 2015

(54) METHOD FOR RESOLVING SUB-CARRIER AMBIGUITIES OF A NUMBER OF TRACKING CHANNELS OF A NAVIGATION SIGNAL

(75) Inventor: Jan Wendel, Munich (DE)

(73) Assignee: Astrium GmbH, Taufkirchen (DE)

( * ) Notice: Subject to any disclaimer, the term of this patent is extended or adjusted under 35 U.S.C. 154(b) by 585 days.

(21) Appl. No.: 13/191,613

(22) Filed: Jul. 27, 2011

(65) Prior Publication Data

US 2012/0026035 A1 Feb. 2, 2012

(30) Foreign Application Priority Data

Jul. 28, 2010 (EP) .................................... 10007819

(51) Int. Cl.
*G01S 19/44* (2010.01)
*G01S 19/29* (2010.01)

(52) U.S. Cl.
CPC *G01S 19/29* (2013.01); *G01S 19/44* (2013.01)

(58) Field of Classification Search
USPC ..................................... 342/357.27; 701/477
IPC ....................................................... G01S 19/44
See application file for complete search history.

(56) References Cited

U.S. PATENT DOCUMENTS

2010/0104046 A1    4/2010   Hodgart et al.

FOREIGN PATENT DOCUMENTS

EP            1 933 469 A1     6/2008
WO       WO 2008/090323 A1     7/2008

OTHER PUBLICATIONS

European Search Report dated Dec. 21, 2010 (six (6) pages).
Fante, Ronald L., "Unambiguous Tracker for GPS Binary-Offset-Carrier Signals", ION Annual Meeting, XX, XX, Jun. 23, 2003, pp. 141-145, XP002338821, (five (5) pages).

*Primary Examiner* — Gregory C Issing
*Assistant Examiner* — Fred H Mull
(74) *Attorney, Agent, or Firm* — Crowell & Moring LLP

(57) ABSTRACT

A method for resolving sub-carrier ambiguities of a total number of tracking channels of a binary offset carrier (BOC) navigation signal is provided. For a simultaneously considered subset of at least four tracking channels, a set of sub-carrier candidate ambiguities is determined based on the sub-carrier modulation. Position and receiver clock error are calculated for each possible combination of sub-carrier ambiguities. Predicted delays are calculated based on each calculated position and receiver clock error. Differences between the predicted delays and the delay candidates originating from each specific combination of subcarrier ambiguities are calculated. A residual is calculated based on the differences and the set of sub-carrier ambiguities and the corresponding position and receiver clock error leading to the smallest residual are selected.

8 Claims, 2 Drawing Sheets

METHOD FOR RESOLVING SUB-CARRIER AMBIGUITIES OF A NUMBER OF TRACKING CHANNELS OF A NAVIGATION SIGNAL

CROSS REFERENCE TO RELATED APPLICATION

The present application claims priority under 35 U.S.C. §119 to European Patent Application No. 10 007 819.5, filed Jul. 28, 2010, the entire disclosures of which afore-mentioned document is herein expressly incorporated by reference.

BACKGROUND AND SUMMARY OF THE INVENTION

Exemplary embodiments of the invention relate to a method for resolving sub-carrier ambiguities of a total number of tracking channels of a binary offset carrier (BOC) navigation signal comprising a carrier modulated by a code modulation function of a given code rate and further modulated by a sub-carrier modulation function of a given sub-carrier rate. For each channel, the method comprises the steps of generating a first estimate of delay based on the code modulation and generating a second estimate of delay based on the sub-carrier modulation.

In a global navigation satellite system (GNSS), a receiver estimates delays in the navigation signals received from different satellites and uses this information, combined with information on the position of the satellites, to estimate its position. The more accurate the estimation of the delays is, the more accurately the receiver can estimate its position.

In current GNSS systems, navigation signals transmitted by the satellites are modulated using a phase shift keying (PSK) modulation of a code onto a carrier signal having a designated carrier frequency. In next generation GNSS systems, like the Galileo system or an improved American global positioning system (GPS), binary offset carrier (BOC) modulations will be used. Like PSK modulation, BOC modulation involves modulating a code onto a carrier. This code is similar to that used in PSK modulation. However, BOC modulation involves further modulating the signal by a sub-carrier which can be represented by a sub-carrier modulation function having a sub-carrier rate and a sub-chip duration. Consequently, a BOC signal consists of a carrier, modulated with a pseudo random noise (PRN) code, and additionally modulated with a binary sub-carrier.

An auto correlation function of a BOC signal shows multiple peaks, as illustrated in FIG. 1 for a BOC (15, 2.5) signal. As known to the person skilled in the art the first parameter (here: 15) of the BOC signal indicates the subcarrier rate whereas the second parameter (here: 2.5) of the BOC signal indicates the code rate. If a receiver uses early (E) and late (L) replicas for code tracking consisting of a respective PRN code modulated with the sub-carrier, a tracking loop can settle on a sidepeak of the correlation function which introduces a bias in the delay estimate. In case of a BOC (15, 2.5) signal the bias is approximately 9.7 m. In case of a BOC (10, 5) signal, the bias is approximately 14.7 m. Obviously, this bias directly translates into a position error which is highly undesirable.

Different techniques have been proposed to overcome this problem, for example Bump Jumping or Sub-carrier Cancellation (SCC).

U.S. Patent Application Publication No. US 2010/0104046 A1 discloses an approach for BOC signal tracking, which is called Double Estimator technique. The entire disclosure of this Patent Application Publication is herein expressly incorporated by reference. While a tracking loop of a conventional receiver includes two loops for carrier and code tracking, a Double Estimator includes three independent but cooperative loops for the carrier, the sub-carrier and code. A simplified block diagram of a Double Estimator tracking loop is shown in FIG. 2. For clarity, complex signals are used in this representation. An input signal s(t) is mixed with a carrier, generated by a numerically controlled oscillator (NCO) 10. The mixed signal splits up in three branches and is mixed with an early (E), a prompt (P) and a late (L) subcarrier replica, respectively, which are generated by a sub-carrier NCO 12. Next, the signals that were mixed with the early and late subcarrier are mixed with a prompt code replica, the signal that was mixed with the prompt subcarrier is split up in three branches and mixed with an early, a prompt and a late code replica. All code replicas are generated by a code NCO 14. The resulting signals are fed to respective adders connected to discriminators and loop filters 16. The discriminators and loop filters 16 are connected to the NCOs 10, 12, 14.

The Double Estimator of US 2010/0104046 A1 provides two independent delay estimates, one from code tracking, $\tau$, and one from sub-carrier tracking, $\tau^*$. The code tracking delay estimate $\tau$ is less accurate while the sub-carrier tracking delay estimate $\tau^*$ is ambiguous with the sub-carrier chip duration Ts. A final delay estimate is calculated by resolving the sub-carrier delay ambiguity using a less accurate code delay estimate as follows:

$$\tau_i^+ = \tau_i^* + T_S \cdot N_i.$$

$N_i$ denotes the sub-carrier ambiguity for a tracking channel i, obtained as follows:

$$N_i = \mathrm{round}\left(\frac{\tau_i - \tau_i^*}{T_S}\right)$$

However, depending on multipath, dynamics and tracking loop bandwidths, the above rounding operation can fail to resolve the sub-carrier ambiguity correctly which leads again to a bias in the final delay estimate.

Exemplary embodiments of the present invention involve a method providing a more accurate way for resolving sub-carrier ambiguities of tracking channels of a binary offset carrier (BOC) navigation signal.

Exemplary embodiments of the invention involve a method for resolving sub-carrier ambiguities of a total number of tracking channels of a binary offset carrier (BOC) navigation signal comprising a carrier modulated by a code modulation function of a given code rate and further modulated by a sub-carrier modulation function of a given sub-carrier rate, for each channel comprising the steps of generating a first estimate of delay based on the code modulation, and generating a second estimate of delay based on the sub-carrier modulation.

According to exemplary embodiments of the invention, the method involves, for a simultaneously considered subset of at least four tracking channels, determining a set of sub-carrier candidate ambiguities based on the sub-carrier modulation; calculating for each possible combination of sub-carrier ambiguities position and receiver clock error; calculating predicted delays based on each calculated position and receiver clock error; calculating differences between the predicted delays and the delay candidates originating from each specific combination of subcarrier ambiguities; calculating a residual based on the differences; and selecting the set of sub-carrier ambiguities and the corresponding position and receiver clock error which leads to the smallest residual.

Exemplary embodiments of the invention provide a method of jointly resolving the sub-carrier ambiguity for a number of tracking channels and calculating a position and time solution which is more robust with respect to dynamics and multipath than the code-based rounding operation described previously which is applied independently for each channel. Compared to solutions where each tracking channel resolves a sub-carrier ambiguity independent from the other channels, the method provides a solution where the probability for a false sub-carrier ambiguity resolution, and in consequence for a bias position and clock estimate, is smaller.

According to a preferred embodiment the step of calculating a residual comprises squaring and summing the differences between the predicted delays and the delay candidates, providing the residual for a specific combination of sub-carrier ambiguities.

According to a further preferred embodiment $k^i$ residuals are calculated with k being the number of ambiguities and i being the number of channels.

It is further preferred when the subset of considered tracking channels comprises a good geometric dilution of precision (GDOP). Especially, for the remaining channels the predicted delays are calculated using the calculated position and receiver clock error. "Remaining channels" are those channels of the total number of tracking channels that are not considered in the subset of tracking channels.

In a further preferred embodiment the sub-carrier ambiguities for the remaining channels are obtained using the calculated predicted delays $\hat{\tau}_i$ for the remaining tracking channels. Preferably, the sub-carrier ambiguities for the remaining channels are obtained by:

$$N_i = \text{round}\left(\frac{\hat{\tau}_i - \tau_i^*}{T_S}\right).$$

Alternatively, the sub-carrier ambiguities are obtained using Real-Time Kinematic-technology for carrier phase ambiguity fixing.

In a further preferred embodiment all tracking channels are considered simultaneously.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
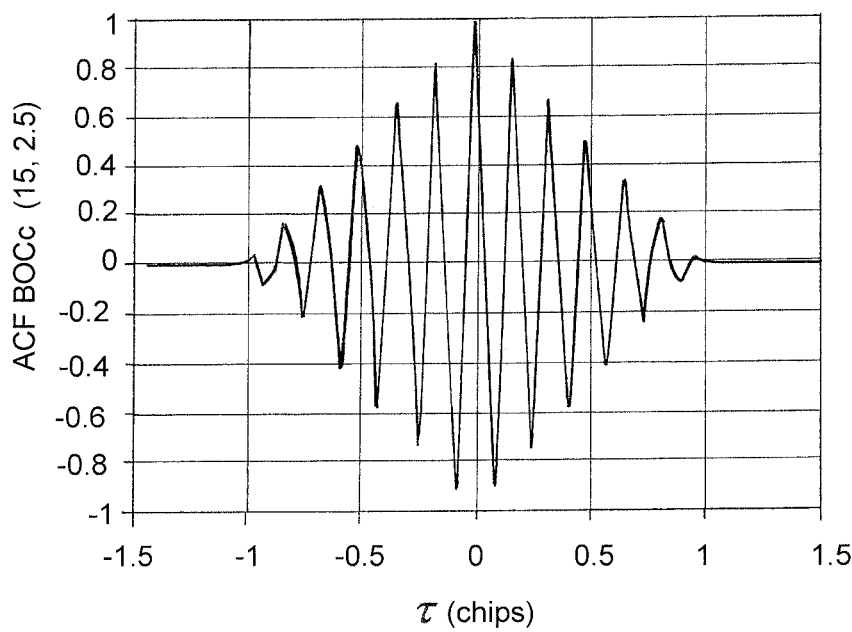
FIG. 1 shows an autocorrelation function of a binary offset carrier (BOC) signal showing multiple peaks.
Figure 2:
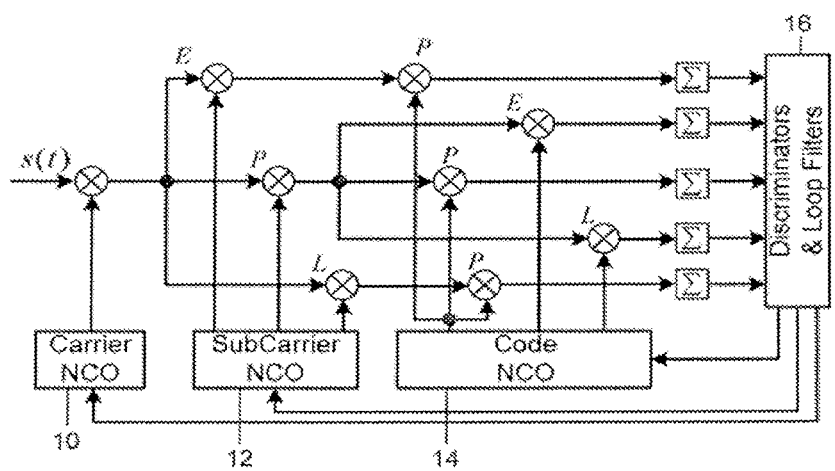
FIG. 2 shows a schematic block diagram of a known Double Estimator tracking loop.

The method according to the invention to resolve sub-carrier ambiguities of a BOC navigation signal makes use and improves the Double Estimator technology known from prior art, e.g. US 2010/0104046 A1. The Double Estimator includes three independent but cooperative loops for carrier, sub-carrier and code of the BOC signal. The Double Estimator provides two independent delay estimates, one from code tracking, $\tau$, and one from sub-carrier tracking, $\tau^*$. The final delay estimate is calculated by resolving the sub-carrier delay ambiguity using the less accurate code delay $\tau$.

To make the method for resolving the sub-carrier ambiguity more robust with respect to dynamics and multipaths than the code-based rounding operation of the Double Estimator technique which is applied independently for each channel, exemplary embodiments of the invention consider all receiver channels simultaneously to resolve the sub-carrier ambiguity. This is in contrast with the attempt to resolve this for each channel independently.

Considering all receiver channels simultaneously to resolve the sub-carrier ambiguity is accomplished by calculating position and receiver clock error estimates considering several sub-carrier ambiguities, and selecting the set of sub-carrier ambiguities and the corresponding position and receiver clock error that provides the smallest residual.

In order to resolve the sub-carrier ambiguities of all channels, first a set of candidate ambiguities has to be determined. A set of candidate ambiguities $N_{i,k}$ for a channel i is given by:

$$N_{i,k} = \text{round}\left(\frac{\tau_i - \tau_i^*}{T_S}\right) + k \cdot T_S,$$

wherein k=0, ±1, ±2, . . . .

It is to be noted that other approaches besides the one above are possible, too.

The corresponding set of delay candidates is given by:

$$\tau_{i,k}^+ = \tau_{i,k}^* + T_S \cdot N_{i,k}.$$

Now, for each possible combination of sub-carrier ambiguities, position and receiver clock error are calculated, e.g. using a recursive weighted least squares approach. Then, based on each calculated position and receiver clock error, predicted delays are calculated. The differences between the predicted delays and the delay candidates are squared and summed, providing the residual for a specific combination of sub-carrier ambiguities. With i channels and k ambiguities to be tested, $k^i$ residuals have to be calculated. This can be done very efficiently, because the matrix relating delay estimates to position and clock error is approximately the same for all combinations of sub-carrier ambiguities, and therefore has to be calculated only once. Finally, the combination of sub-carrier ambiguities is selected which leads to the smallest residual.

Alternatively, to considering all channels simultaneously, it is also possible to consider only a subset of at least four channels with a good geometric dilution of precision (GDOP), and resolve their sub-carrier ambiguities as described above. Then, using the calculated position and receiver clock error, predicted delays $\hat{\tau}_i$ can be calculated for the remaining channels. Finally, the sub-carrier ambiguities for the remaining channels are obtained using these predicted delays:

$$N_i = \text{round}\left(\frac{\hat{\tau}_i - \tau_i^*}{T_S}\right).$$

Furthermore, instead of resolving the sub-carrier ambiguities as described above, it is also possible to adapt standard RTK (Real-time Kinematic) technique for carrier phase ambiguity fixing like the LAMDA method to resolve sub-carrier ambiguities.

Figure 3:
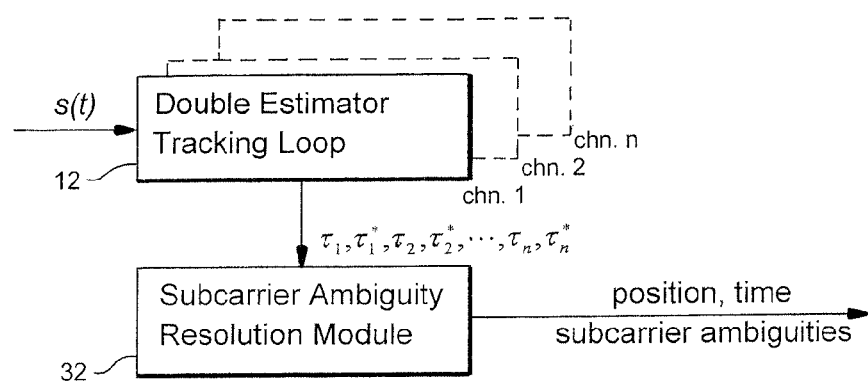
FIG. 3 shows a schematic block diagram illustrating the method according to the invention.

FIG. 3 shows a schematic diagram illustrating the method according to the invention. A BOC navigation input signal s(t) is fed to a Double Estimator tracking loop 30 consisting of channels chn.1, chn.2, ..., chn.n. As a result delay estimates $\tau_1, \tau_1^*, \tau_2, \tau_2^*, \ldots, \tau_n, \tau_n^*$ are provided to a sub-carrier ambiguity resolution module 32. The sub-carrier ambiguity resolution module 32 processes the delay estimates and calculates positions and receiver clock errors from delay candidates $\tau_{i,k}^+$ from which predicted delays can be calculated. After having calculated differences between the predicted delays and the delay candidates $\tau_{i,k}^+$ for a respective tracking channel, the residual for a specific combination of sub-carrier ambiguities based on the differences can be calculated as outlined above. As a result the set of sub-carrier ambiguities in the corresponding position and receiver clock error is selected which leads to the smallest residual.

An advantage of the method according to the invention is that regarding the resolution of the sub-carrier ambiguities, the resulting receiver is more robust with respect to multipath and dynamics compared to the Double Estimator receiver known from US 2010/0104046 A1 where each channel resolves the sub-carrier ambiguity independent from the other channels. Therefore, the probability for a false sub-carrier ambiguity resolution, and in consequence for a bias position and clock estimate, is smaller.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for resolving sub-carrier ambiguities of a total number of tracking channels of a binary offset carrier (BOC) navigation signal comprising a carrier modulated by a code modulation function of a given code rate and further modulated by a sub-carrier modulation function of a given sub-carrier rate, for each channel comprising:
   generating a first estimate $\tau$ of delay based on the code modulation;
   generating a second estimate $\tau^*$ of delay based on the sub-carrier modulation,
   wherein for a simultaneously considered subset of at least four tracking channels, the method further comprises
   determining a set of sub-carrier candidate ambiguities $N_{i,k}$ based on the sub-carrier modulation by processing the first and the second estimate of delay by calculating $$N_{i,k} = \text{round}\left(\frac{\tau_i - \tau_i^*}{T_s}\right) + k \cdot T_s$$

with i being a channel, k being the ambiguities, and $T_s$ being a sub-carrier chip duration;
   calculating, for each possible combination of the sub-carrier candidate ambiguities, position error and receiver clock error;
   calculating predicted delays based on each of the calculated position error and receiver clock error;
   calculating differences between the predicted delays and delay candidates, wherein each of the delay candidates is based on a sub-carrier candidate ambiguity, of the set of sub-carrier candidate ambiguities, for a respective tracking channel;
   calculating a residual for a specific combination of sub-carrier ambiguities based on the calculated differences by squaring and summing the differences between the predicted delays and the delay candidates, providing the residual for the specific combination of sub-carrier ambiguities;
   selecting a set of sub-carrier ambiguities and corresponding position error and receiver clock error leading to the smallest residual; and
   determining a position of a GNSS receiver corresponding to the position error and receiver clock error.

2. The method according to claim 1, wherein $k^i$ residuals are calculated with k being the number of ambiguities and i being the number of channels.

3. The method according to claim 1, wherein the subset of considered tracking channels comprises a good geometric dilution of precision (GDOP).

4. The method according to claim 3, wherein predicted delays are calculated using the calculated position error and receiver clock error for remaining channels.

5. The method according to claim 4, wherein sub-carrier ambiguities for the remaining channels are obtained using the calculated predicted delays for the remaining tracking channels.

6. The method according to claim 5, wherein the sub-carrier ambiguities for the remaining channels are obtained by:

$$N_i = \text{round}\left(\frac{\hat{\tau}_i - \tau_i^*}{T_S}\right).$$

7. The method according to claim 5, wherein the sub-carrier ambiguities for the remaining channels are obtained using Real Time Kinematic-technology for carrier phase ambiguity fixing.

8. The method according to claim 1, wherein all tracking channels a considered simultaneously.

* * * * *